United States Patent
Socha

(10) Patent No.: US 10,370,860 B2
(45) Date of Patent: Aug. 6, 2019

(54) MULTI-FUNCTIONAL UNDERLAYMENT ACOUSTICAL MAT AND SYSTEM

(75) Inventor: Dennis Albert Socha, Buffalo Grove, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 273 days.

(21) Appl. No.: 12/564,204

(22) Filed: Sep. 22, 2009

(65) Prior Publication Data

US 2010/0077684 A1    Apr. 1, 2010

Related U.S. Application Data

(60) Provisional application No. 61/100,529, filed on Sep. 26, 2008.

(51) Int. Cl.
| | |
|---|---|
| *E04F 15/20* | (2006.01) |
| *B32B 27/12* | (2006.01) |
| *B32B 5/02* | (2006.01) |

(52) U.S. Cl.
CPC .......... *E04F 15/20* (2013.01); *B32B 5/022* (2013.01); *B32B 27/12* (2013.01); *E04F 15/203* (2013.01)

(58) Field of Classification Search
CPC ........ E04F 15/20; E04F 15/203; E04F 15/182
USPC .............. 52/144, 145, 403.1, 408, 506.01; 181/284, 290, 294
See application file for complete search history.

(56) References Cited

U.S. PATENT DOCUMENTS

| | | | |
|---|---|---|---|
| 4,698,249 A | 10/1987 | Brown | |
| 5,481,838 A * | 1/1996 | Fishel | B32B 5/26 52/169.14 |
| 5,860,255 A * | 1/1999 | Fishel | B32B 27/12 52/169.14 |
| 5,979,133 A * | 11/1999 | Funkhouser | E04D 5/10 428/353 |
| 6,077,613 A * | 6/2000 | Gaffigan | B32B 3/14 428/442 |
| 6,086,104 A * | 7/2000 | Marchisio et al. | 280/851 |
| 6,167,668 B1 * | 1/2001 | Fine | B32B 13/02 52/403.1 |
| 6,599,599 B1 * | 7/2003 | Buckwater | A47G 27/0468 428/317.3 |
| 7,096,630 B1 * | 8/2006 | Keene | E04F 15/18 52/302.1 |
| 7,886,488 B2 * | 2/2011 | Payne, Jr. | E04F 15/20 52/144 |
| 8,171,687 B2 | 5/2012 | Dellinger et al. | |

(Continued)

FOREIGN PATENT DOCUMENTS

CA    2659727 A1    9/2009

OTHER PUBLICATIONS

Kimberly-Clark Corporation, 200 Series Car Cover Fabric Safety Data Sheet, Jan. 28, 2007, pp. 1-5.

(Continued)

*Primary Examiner* — Ryan D Kwiecinski
(74) *Attorney, Agent, or Firm* — Greer, Burns & Crain, Ltd.; Brian Wishnow; Philip T. Petti

(57) ABSTRACT

An acoustic isolation mat for placement between a subfloor and a finished floor with a poured underlayment includes a bottom layer of entangled fibers contacting the subfloor; and a top layer attached to the bottom layer and being a water resistant nonwoven polymeric fabric over which the underlayment is poured.

3 Claims, 2 Drawing Sheets

(56) References Cited

U.S. PATENT DOCUMENTS

| | | | |
|---|---|---|---|
| 2002/0088193 A1 | 7/2002 | Reimers et al. | |
| 2003/0172600 A1* | 9/2003 | Choi | B32B 5/32 |
| | | | 52/144 |
| 2003/0219582 A1* | 11/2003 | Ramesh | E04F 15/18 |
| | | | 428/304.4 |
| 2005/0147810 A1* | 7/2005 | Suzuki | A61F 13/535 |
| | | | 428/339 |
| 2006/0130416 A1 | 6/2006 | Mohr et al. | |
| 2006/0230699 A1 | 10/2006 | Keene | |
| 2007/0039268 A1* | 2/2007 | Ambrose et al. | 52/403.1 |
| 2007/0066176 A1* | 3/2007 | Wenstrup | B32B 5/022 |
| | | | 442/415 |
| 2009/0042471 A1* | 2/2009 | Cashin et al. | 442/182 |
| 2009/0242325 A1* | 10/2009 | Dellinger | E04B 1/84 |
| | | | 181/290 |
| 2010/0066121 A1* | 3/2010 | Gross | G10K 11/162 |
| | | | 296/146.5 |
| 2010/0229486 A1* | 9/2010 | Keene | E04F 15/20 |
| | | | 52/403.1 |

OTHER PUBLICATIONS

Canadian Office Action in Canadian Patent Application No. 2,738,460 dated Oct. 26, 2015.
Mexican Office Action for Mexican Patent Application No. MX/a/2011/002873, dated Jun. 16, 2016.

* cited by examiner

MULTI-FUNCTIONAL UNDERLAYMENT ACOUSTICAL MAT AND SYSTEM

RELATED APPLICATION

This application claims priority pursuant to 35 USC § 119(e) based on U.S. Provisional Patent Application No. 61/100,529 Sep. 26, 2008.

BACKGROUND OF THE INVENTION

The present invention relates to flooring systems designed to reduce sound transmission, and more specifically relates to an improved nonwoven mat which improves acoustical isolation while avoiding potential moisture retention occurring in some conventional poured underlayment installations.

Conventional flooring systems include a subfloor of poured concrete or plywood. Various combinations of sound mats and underlayments located between the subfloor and the finished floor (typically ceramic tile, vinyl tile or hardwood) have been used to reduce sound transmission.

Sound rated or floating floor systems are known for acoustically isolating a room beneath a floor on which impacts may occur, such as pedestrian footfalls, sports activities, dropping of toys, or scraping caused by moving furniture. Impact noise generation can generally be reduced by using thick carpeting, but where vinyl, linoleum, tile, hardwood, wood laminates and other types of hard surfaces including decorated concrete finishes are to be used, a sound rated floor is desirable and required by codes for acoustical separation of multifamily units. The transmission of impact noise to the area below can be reduced by resiliently supporting or acoustically decoupling and/or dampening the underlayment floor away from the floor substructure. The entire floor system contributes to transmitting the noise into the area below. If the floor surface receiving the impact is isolated from the substructure, then the impact sound transmission will be greatly reduced. A dampening material can also reduce transmitted noise. Likewise, if the ceiling below is isolated from the substructure, the impact sound will be restricted from traveling into the area below.

Sound rated floors are typically evaluated by American Society for Testing and Materials (ASTM) Standards E90 for Sound Transmission Class (STC) ratings and E492 with respect to Impact Insulation Class (IIC). The greater the IIC rating, the less impact noise will be transmitted to the area below. The greater the STC rating, the less airborne sound will be transmitted to the area below. The International Building Code (IBC) specifies that floor/ceiling installations between units on multi-family buildings must have an IIC rating of not less than 50 and an STC rating of not less than 50. Even though an IIC rating of 50 meets many building codes, experience has shown that in luxury condominium applications floor-ceiling systems having an IIC of less than 55 may not be acceptable because some impact noise is still audible and considered annoying at those levels.

Conventional floor systems may employ a poured underlayment located between the finished floor and the subfloor, typically for providing a smooth, monolithic substrate for the finished floor. A suitable poured underlayment is LEVELROCK® floor underlayment sold by United States Gypsum Company of Chicago, Ill. (USG). LEVELROCK® underlayment is a mixture of Plaster of Paris, Portland Cement and Crystalline Silica. The underlayment is part of a floor system that also may include a fabric, polymer or combination of both or rubber-like mat which provides sound isolation. Several manufacturers of drainage mats and sound mats manufacture entangled mats that can be utilized for sound isolation (IIC and STC) for floor/ceiling assemblies. These mats are typically sandwiched between the subfloor and a poured floor underlayment, and typically involve a matrix of various petrochemical materials, such as nylon, polypropylene, or polyethylene with some type of backing. The function of the backing is to provide a platform upon which the underlayment is poured.

There are concerns that these backings may leak water into the cavity with negative consequences. One potential issue is that excess water in the poured underlayment slurry prior to setting provides moisture that can encourage the growth of mold and mildew; second is that moisture can affect some materials like nylon and be absorbed by the polymer, causing it to change dimension. When this dimensional change takes place, the result is often lipping at seams and can cause subsequent cracking issues within the underlayment itself.

Because the backings on current mats in the marketplace tend to be thin, there is little or no contribution to the sound attenuation performance of the sound mat. The IIC and STC performance of the sound mat is achieved through a decoupling effect.

BRIEF SUMMARY OF THE INVENTION

The present multi-functional acoustical underlayment mat meets or exceeds the drawbacks of conventional mats by providing sound isolation, as well as repelling moisture and has a durable surface capable of withstanding trade traffic. When used as a base upon which poured underlayment is applied, moisture from the underlayment slurry is prevented from migrating to the subfloor or related construction. One of the ways in which these goals are achieved is by providing a composite mat having a base or lower layer of entangled polymeric fiber, and an upper layer of sound absorbent, water-repellant nonwoven polymeric fabric which is distinct from the base layer material. The upper layer is preferably a composite of 2 different materials—one of which has dampening characteristics and the upper layer upon which the underlayment is poured, and which has superior moisture and wear resistance. Since the layers are different, each layer has discontinuous acoustic properties, which reduces the amount of sound energy transmitted between the layers, and ultimately, through the floor.

More specifically, an acoustic isolation mat is provided for placement between a subfloor and a finished floor with a poured underlayment. The mat includes a bottom layer of entangled polymeric fibers contacting the subfloor and a top layer attached to the bottom layer and being a water resistant nonwoven polymeric fabric over which the underlayment is poured.

In a preferred embodiment, an acoustic isolation underlayment system is provided for placement between a subfloor and a finished floor. The system includes a sound reduction mat having a bottom layer of space-defining supporting structure providing de-coupling of sound and contacting the subfloor, and a top layer attached to the bottom layer and being a water repellant, wear resistant, nonwoven polymeric fabric which also provides sound dampening properties. A poured underlayment is placed upon the top layer of the sound mat.

DETAILED DESCRIPTION OF THE INVENTION

Figure 1:
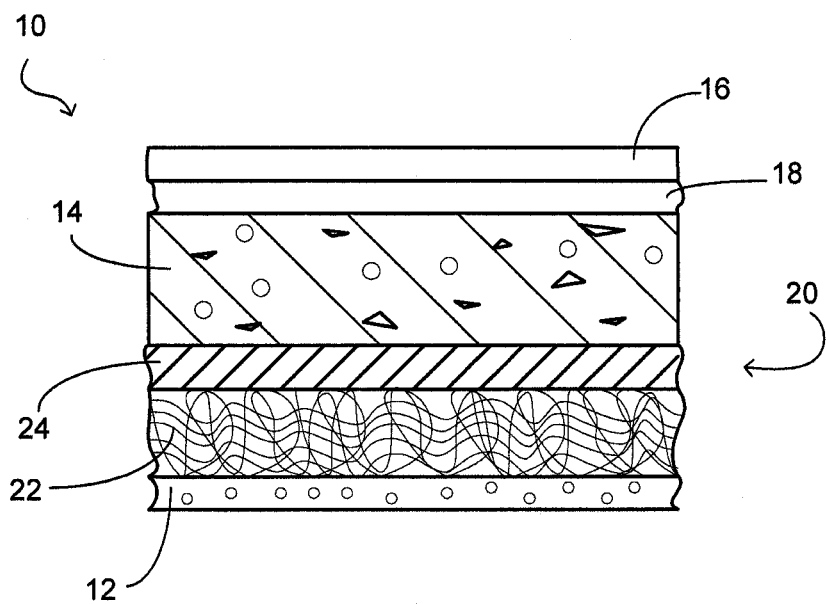
FIG. 1 is a schematic vertical section of the present underlayment system.

Referring now to FIG. 1, in which the layers are shown schematically and are not necessarily to scale, the present flooring system is generally designated 10, and is used in a construction having a subfloor 12, shown schematically and typically at least one layer of plywood or Oriented Strand Board (OSB). The subfloor 12 may also be either poured concrete or concrete planks. While only the above two alternatives are disclosed, it is contemplated that any conventional subfloor material will be suitable for use with the present flooring system 10. As is known in the art, the subfloor 12 is supported by framing members (not shown) typically made of wood or steel and available in several configurations, or a poured concrete deck or concrete planks.

The present flooring system 10 includes a poured underlayment, such as LEVELROCK® floor underlayment, generally designated 14 which is disposed between the subfloor 12 and a finished floor 16 which is typically ceramic tile, vinyl tile, hardwood (including laminate wood floors and engineered wood floors) or other hard materials other than carpeting. Note that the acoustical properties of a carpet and pad installation are such that they typically eliminate the need for a sound mat system. However, some of the thin carpet tiles being used in today's office buildings have poor acoustical values and a sound system with underlayment and sound mat may be required for that floor covering as well. An adhesive layer 18 such as mortar, mastic or chemical adhesive secures the finished floor 16 to the underlayment 14. In the case of wood floors these might be floating over the underlayment or glued depending on a variety of job factors and manufacturer recommendations.

A sound reduction mat (SRM) 20 is disposed upon the subfloor 12, and is made of polymeric material. In the preferred embodiment, the sound reduction mat 20 is provided with a bottom layer 22 of supporting, space-defining structure such as entangled fibers or depending, integral small feet contacting the subfloor 12. The bottom layer 22 is also referred to as a decoupling layer due to its acoustical properties of creating an acoustically isolated space. In addition, the bottom layer 22 is preferably made of a material such as nylon, polypropylene or polyethylene. A preferred thickness or height of the bottom layer 22 is in the range of ⅛-1 inch (0.635-2.54 cm). Also, the bottom layer 22 is provided in sufficient density to support the weight of the flooring system 10 as well as loading on the floor, while retaining a layer of air which also contributes as a sound isolating barrier. It will be appreciated that the thickness of the bottom layer 22 may vary to suit the situation and the desired acoustical performance of the floor system 10.

Secured or attached to the bottom layer 22 of the SRM 20 is a top layer 24 attached to the bottom layer by heat fusion, adhesives, co-extrusion or similar manufacturing technology. A desirable material for the layer 24 is manufactured by Kimberly-Clark Corporation, Neenah Wis. and is a "Sorbent Acoustics" 5.5 oz./sq.yd. (142 g/sq. m) pinbonded MB fabric. This pinbonded fabric was found to have desirable acoustic properties, as well as being water resistant. Properties of the fabric 24 are provided below:

| | |
|---|---|
| Name: | 5.5 oz./sq.yd. (142 g/sq. m) Pinbonded MB Fabric |
| Color: | White |
| Basis Weight: | 5.5 oz./sq.yd. (142 g/sq. m) |
| Bulk: | 0.10 inches (0.254 cm) |
| Very Edge Basis Weight: | 5.21 oz./sq.yd. (147.7 g/sq. m) |
| Average In Roll Thickness: | 0.06 lbs. (.0271 kg) |
| Oil Capacity: | 1350% |
| Pinbond Cohesion Test: | 1827 grams force |
| Color (Whiteness) Rd | 98 |

Thus, the present mat 20 includes two separate layers, each of which has distinct acoustic isolating properties, while only the top layer 24 is water resistant. Taken together, the two layers 22, 24 provide discontinuity of material and dampening properties, which is a significant factor in reducing sound transmission through the flooring system 10.

Figure 2:
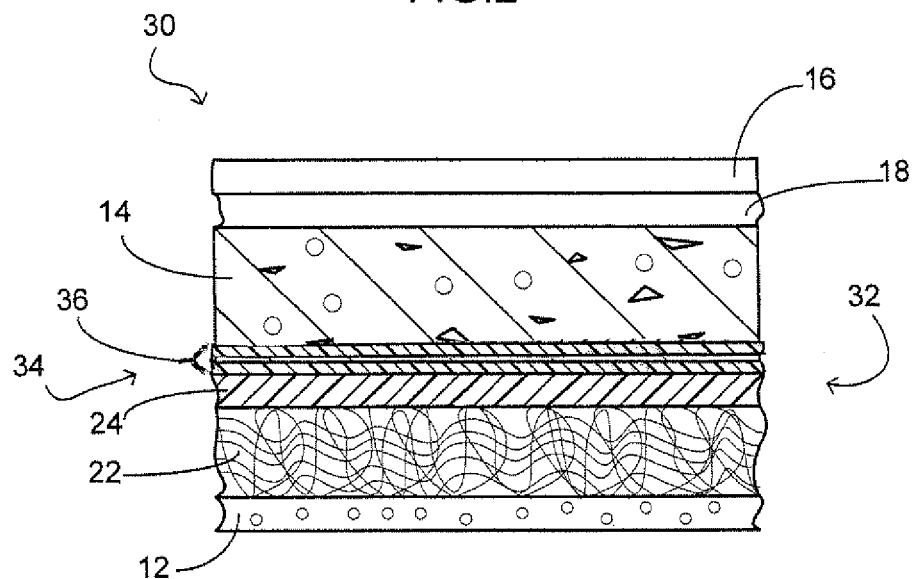
FIG. 2 is a schematic vertical section of a preferred embodiment of the present underlayment system.

Referring now to FIG. 2, in which an alternate flooring system is generally designated 30, in which components shared with the system 10 are identified with identical reference numbers, and in which the respective layers are shown schematically and are not necessarily to scale, it is preferred that a mat 32, similar to the mat 20 but having a top layer 34 or approximately ⅛ inch (.3175 cm) is made of a sandwich of wear resistant, water repellant material 36 layered over the above-described non woven, melt blown polypropylene fabric 24, which is water resistant. The material 36 is preferably SM-250 manufactured by Kimberly-Clark Corporation, Neenah, Wis. USA. The SM-250 is a predominantly polypropylene fabric, being a three layer laminate, made of two outer layers of spunbond material, sandwiching a meltblown center. All three layers are ultrasonically laminated. The purpose of the SM-250 36 is to provide enhanced water resistance and durability, and provides enhanced acoustical properties through combination of dissimilar materials for the dampening layer on top of the decoupling or bottom layer 22, and a wear resistant surface that can stand up to the trade traffic to which the sound mat is exposed. Such trade traffic is encountered after the application of the sound mat 32 and prior to the laying of the poured underlayment 14.

More specifically, the preferred SM-250 36 is referred to by Kimberly-Clark Corporation as Block-It™ 200-Series Car Cover Fabric having the following properties:

| | |
|---|---|
| Basis weight | 2.5 osy |
| Thickness | 0.026 inch (0.06604 cm) |
| Grab Tensile | Machine Direction 36 pounds (16.308 kg) |
| | Cross Direction 30 pounds (13.59 kg) |
| Trap Tear | Machine Direction 14 pounds (6.34 kg) |
| | Cross Direction 12 pounds (5.436 kg) |
| Taber Abrasion | 5 (visual rating) |
| Frazier Porosity | 33 ft 3/ft2/min (11 m3/m2/min) |
| MVTR | 4300 g/m2/day |
| Hydrohead | 48 cm (121.92 cm) |
| UV Additive | 1.25% by weight. |

In the above data, Grab Tensile measures the effective strength of a material. The specimen is clamped at both ends and pulled at a constant rate of extension to obtain results before the point of rupture. Trap Tear measures fabric resistance to tear propagation under a constant rate of extension. A fabric cut on one edge is clamped along the nonparallel sides of a trapezoidal shaped specimen and is pulled, causing tear propagation in the specimen perpendicular to the load.

Taber Abrasion relates to the resistance of a fabric to abrasion when subjected to a repetitive rotary rubbing action under controlled
pressure and abrasive action. Abrasion results are general indicators of a fabric's durability or wear performance. Frazier Porosity measures the rate and volume of air flow through a fabric under a prescribed surface pressure differential. Under controlled conditions, a suction fan draws air through a known area of fabric. The air flow rate is adjusted to a prescribed pressure
differential. Results are expressed in air flow (cu ft./min). Air flow rate and volume are an indication of fabric breathability.

Kimberly-Clark references several ASTM methods when testing fabrics as listed below:
Grab Tensile: ASTM D5034-95 and D1117
Trap Tear: ASTM D5733-95
Taber Abrasion: ASTM D5035
Frazier Porosity: ASTM D737-96

The SM-250 used in the present application is composed of polypropylene with a CAS/EINECS No. of 9003-07-0 at 80-100%; Carbon black with a CAS/EINECS No. of 1333-86-4/215-609-9 of 0.1-1%; Titanium Dioxide with a CAS/EINECS No. 13463-67-7/236-675-5 of 0.1-0.5% and UV Stabilizer at 1-5%.

In the preferred embodiment, the two materials (SM-250 36 and the pin bond 24) are laminated together, preferably with an adhesive to act as one, however other attachment technologies, are also contemplated.

Thus, the present mat 32 (see FIG. 2) includes two separate layers, each of which has distinct acoustic isolating properties, while only the top layer 34 is water repellant and durable. Taken together, the two layers 22, 34 provide discontinuity of material and dampening properties, which is a significant factor in reducing sound transmission through the flooring system 30. In addition, the sound reduction mat 32 with the sound dampening properties of the top layer 34 allows for a lower thickness of the bottom layer 22 in the range of 0.125-0.375 inch (0.318-0.953 cm) and a lower thickness of the underlayment 14 used in the range of 0.5 inch-1 inch (1.27-2.54 cm), resulting in a lower overall profile of the sound system 30 while achieving significant sound attenuation.

Upon testing the mat 32 for water resistance, water was poured from a height of 4 ft. (1.22 m) upon the mat. This test was intended to simulate the pouring of the wet floor underlayment 14 on a jobsite. It was found that the water was repelled completely and did not penetrate the mat 32. Thus, when underlayment slurry 14 is poured upon the mat 32, the moisture in the slurry will be prevented from penetration to the subfloor 12 by the present mat 32. A suitable water resistance test is the ASTM D1776 Hydrohead Test.

In an installation, the mat 20, 32 is first placed upon the subfloor 12, so that the lower layer 22 is in contact with the subfloor. Next, the underlayment 14 is installed. In the preferred embodiment, the poured underlayment 14 is USG LEVELROCK® floor underlayment cement, being provided in various formulations having a composition including main ingredients of Plaster of Paris Portland Cement and other additives. This underlayment cement 14 is combined at the jobsite with water and sand at various ratios (depending upon the desired strength) and pumped onto the subfloor at various thicknesses. In general, sound mats compromise the durability of the floor, and to offset this require a higher thickness of underlayment to be applied over them. However, due to the relatively thin thickness of the present sound mat—especially the layer contributing to the dampening properties of the SRM invention, the potential exists for lower thicknesses of underlayment to be used. Other pourable underlayments are contemplated. Upon setting of the underlayment 14, the finished floor 16 is applied as is well known in the art.

A similar floor system constructed above was tested using the Robinson rolling weight test, and achieved satisfactory results.

While particular embodiments of the present multi-functional acoustical underlayment mat and system have been described herein, it will be appreciated by those skilled in the art that changes and modifications may be made thereto without departing from the invention in its broader aspects and as set forth in the following claims.

The invention claimed is:

1. An acoustic isolation flooring system consisting of:
    a sound reduction mat of:
        a first layer made of two separate material layers made of different materials that are bonded to each other, wherein one of said material layers is a water-resistant and wear-resistant fabric and another of said material layers is a water-resistant, sound dampening material; and
        a single, second layer of a water resistant, nonwoven polymeric fabric including a plurality of tangled fibers and space between said fibers that defines an air layer for decreasing sound transmission through said second layer;
    said first layer of water and wear-resistant fabric is bonded to said second layer of nonwoven polymeric fabric, and an underlayment of a finished floor is poured over said first layer of said water and wear-resistant fabric.

2. The system of claim 1, wherein said water and wear-resistant fabric is laminated to said nonwoven polymeric fabric, and said latter fabric is pinbonded MB fabric.

3. The system of claim 1 wherein said water and wear-resistant fabric is SM-250 polypropylene and said nonwoven polymeric fabric is a pinbonded MB fabric.

* * * * *